UNITED STATES PATENT OFFICE.

LAMMOT DU PONT, OF WILMINGTON, DELAWARE.

IMPROVEMENT IN PLATES FOR PRESSING GUNPOWDER.

Specification forming part of Letters Patent No. 50,104, dated September 26, 1865.

*To all whom it may concern:*

Be it known that I, LAMMOT DU PONT, of Wilmington, in the county of New Castle and State of Delaware, have invented a certain new and useful Improvement in the Application of Hard-Rubber Plates for Pressing Gunpowder; and I do hereby declare the following to be a full, clear, and exact description of the same.

In pressing gunpowder, for converting it from powder-dust into cake, plates of different material have been used, such as metal, wood, leather, &c.; but I find that plates composed of hard or indurated rubber answer a much better purpose than any other material hitherto known or used for this purpose. Hard rubber possesses many properties and qualities peculiar to itself in the way of strength, lightness, susceptibility of being smoothly surfaced, easily cleansed, and with little liability to the clinging of matter to it. In the use which I propose to make of it its advantages may be mainly stated to be, first, lightness; second, occupying less space in the press; third, the powder does not adhere to it; fourth, its smooth surface and stiffness without liability to crack or break.

I use the ordinary hard or indurated rubber of commerce, which I find answers every purpose. The powder dust is placed on or between a series of these plates and pressure applied thereto vertically or horizontally, or both, and in any known way. This pressure converts the powder-dust into cakes, after which it may be removed for granulation.

Having thus fully described my invention, what I claim, and desire to secure by Letters Patent, is—

The use of plates made of hard or indurated rubber for pressing gunpowder, as and for the purpose substantially herein described.

L. DU PONT.

Witnesses:
    H. BELIN,
    W. R. BRINCKLE.